United States

[11] 3,905,224

Himmler et al.

[45] Sept. 16, 1975

[54] VIBRATION MEASURING PICKUP

[75] Inventors: Gunther Himmler, Darmstadt; Klaus-Peter Ohms, Eberstadt, both of Germany

[73] Assignee: Gebr. Hofmann KG, Darmstadt, Germany

[22] Filed: Oct. 12, 1972

[21] Appl. No.: 296,926

[30] Foreign Application Priority Data

Nov. 26, 1971 Germany............................ 2158853

[52] U.S. Cl. .................................................. 73/71.3
[51] Int. Cl.[2] ...................... G01D 5/32; G01H 9/00
[58] Field of Search ............ 73/71, 71.1, 71.3, 71.4

[56] References Cited
UNITED STATES PATENTS

| | | | |
|---|---|---|---|
| 2,361,349 | 10/1944 | Frazier | 73/71.3 |
| 2,540,105 | 2/1951 | Dunbar et al. | 73/71.3 |
| 2,596,048 | 5/1952 | Severs | 73/71.4 |
| 2,958,786 | 11/1960 | Millis | 73/71.4 |
| 3,504,533 | 4/1970 | Rodewalt | 73/71 |
| 3,546,925 | 12/1970 | Barton | 73/71 |

*Primary Examiner*—James J. Gill
*Attorney, Agent, or Firm*—Cushman, Darby & Cushman

[57] ABSTRACT

A pickup for measuring mechanical vibrations having a sprung mass which moves as of function of the vibrations with a member having an inclined edge, preferably straight line or circular, extending between a light source and detector to effect a mechanical reduction of the vibration excursions to extend the measuring range. The spring preferably has a rigidity which is greater at the start of the spring incursion than towards the end of the spring incursion.

2 Claims, 5 Drawing Figures

PATENTED SEP 16 1975
3,905,224
Fig.1.
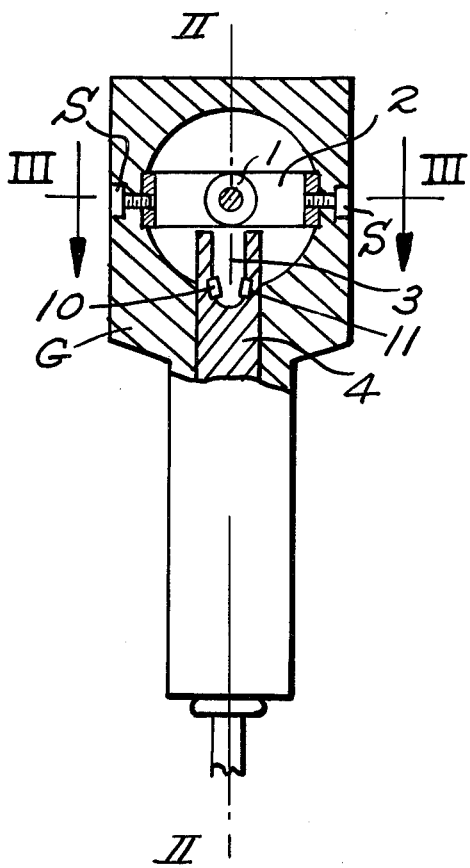
Fig.2.
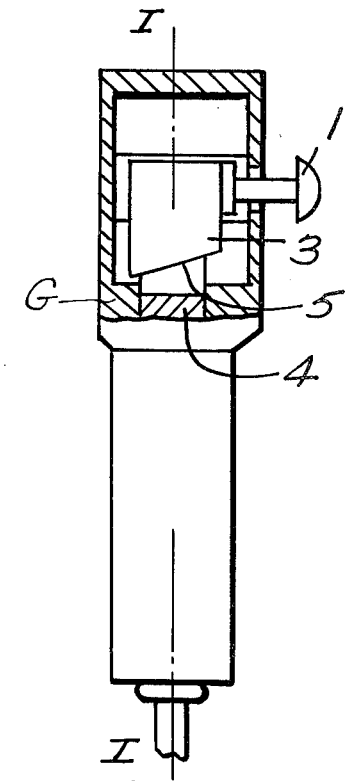
Fig.3.
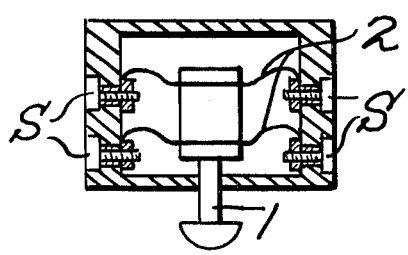
Fig.4.
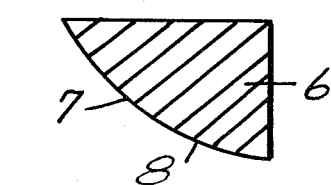
Fig.5.

3,905,224

VIBRATION MEASURING PICKUP

This invention relates to a pickup for measuring vibrations, with a sprung mass for sensing the vibrations, the amplitude of which is determined by a vibration measuring device and/or transducer.

Many pickups now used include a mass for sensing the vibrations to be measured, which are determined by means of a spring of a certain constant rigidity. This spring is suspended elastically and has an amplitude which is used for determining the vibrations for display on a meter. This type of pickup has several disadvantages.

One of the disadvantages is that the reaction of the spring mass of the pickup on the rotor being tested is included in the measurement and this produces grossly incorrect results. In order to minimize the reactions of the pickup because of this coupled mass and the required contact pressure, it is necessary to reduce the moving mass of the pickup as much as possible. Moreover, constant phase-frequency characteristics of the pickup are required for measuring the real magnitude and phase of the vibrations, something which pickups now used, because of their mechanical and electrical resonances, do not have.

It is now the object of this invention to eliminate said disadvantages and to provide an improved pickup which, in particular, makes it possible to extend the measuring range, especially to low frequencies. In addition, the accuracy of measurement is improved.

This is achieved by providing a mechanical reduction for the vibration amplitude. According to the invention, the vibrations of the sprung mass will, therefore, not be directly used for the measuring procedure, but instead indirectly by interposing a reduction. This makes it possible, for example, to use a spring of different rigidity as a function of the spring excursion for the elastic suspension in such a way that at the start and in the first stage of the spring excursion the rigidity is greater than in the second stage and towards the end of the spring excursion with the rather long spring excursions being reduced in the vibration measurement to values within the measuring range of the transducer. Therefore, the measuring range can be extended to low frequencies where the spring rigidity and, consequently, the lowest proper frequency is very low. It is further possible to increase the accuracy of measurement by eliminating any reactions. It is further very important to be able to use an extremely small mass. In contrast, the mass is very large in known electromagnetic pickups, for example.

According to a preferred embodiment, this mechanical reduction is obtained by a measuring lug which is permanently connected with the sprung mass and provided with a measuring end which is inclined in relation to the direction of vibration of the sprung mass and the vibration amplitudes of which are measured by the measuring device which is preferably optical. In this connection, it is useful to have the inclined measuring end form a straight line at an angle of less than 45 degrees with respect to the direction of vibration of the sprung mass. The inclined measuring end, however, can also be bent, preferably in a circle.

The above and other objects and features of the invention will become apparent from the following detailed description of several embodiments of the invention with reference to the accompanying drawings in which:

FIG. 1 illustrates a cross-section of a preferred embodiment of a pickup along line I — I of FIG. 2;

FIG. 2 illustrates a section at right angle to FIG. 1 through the pickup, along the line II — II of FIG. 1;

FIG. 3 is a section along the line III — III in FIG. 1; and

FIGS. 4 and 5 are side views of preferred embodiments of a measuring lug used according to the invention.

The pickup illustrated in FIGS. 1 - 3 has a housing G in which a mass 1, adapted as a sensor, is flexibly suspended by two flat springs 2. The flat springs 2 are permanently attached to both mass 1 and housing G by means of screws S. Flat springs 2 have two different characteristic rigidities as a function of the spring excursion in such a way that at the start and in the first stage of the spring excursion the rigidity is greater than in the second stage and towards the end of the spring excursion. This results in a steep curve in the first stage which is required for applying the necessary pressure to the object under test. In the second stage, however, the more flat curve prevails. Therefore, the spring rigidity and the lowest proper frequency are very low, extending the measuring range of the pickup towards low frequencies. This, however, leads to a relatively long spring excursion which exceeds the measuring range of conventional pickups and makes it necessary to reduce the spring excursion in order to create a smaller and measurable range. According to the invention, this reduction is achieved in a mechanical way by a measuring lug or member 3 which is permanently connected with the mass 1 and having a measuring edge which is inclined in relation to the direction of vibration of the mass 1. The vibration excursions of this inclined measuring edge are measured by means of an optical pickup 4 with an U-shaped end into which the measuring lug 3 enters. On this occasion, the two legs of the U-shaped end of the pickup 4 accommodate for example a photocell 10 and a light source 11.

Inasmuch as the measuring lug 3 is entering more or less into the light beam between the two legs of the U-shaped end of the optical pickup 4 depending on the extent of the vibration excursions, the resultant quantity of light incident upon the photocell varies in linear proportion to the vibration excursion.

According to the invention, the vibration excursion of mass 1 is consequently not measured directly but indirectly, inasmuch as the measuring lug 3 with the inclined end 5 provides in the simplest possible way a mechanical reduction of the vibration excursion. This linear reduction is the greater the smaller the angle between inclined end 5 and the direction of vibration since, with a small angle, the variations of the explored area resulting from the light rays cast, are relatively insignificant.

Thus there is no need to arrange pickup 4 perpendicular to the direction of vibration as any other angle may be used. It is possible, therefore, in particular to arrange the pickup 4 parallel to the direction of vibration which naturally requires the other end of the measuring lug 3 to be bevelled, as opposed to the arrangement illustrates in FIGS. 1 - 3. However, the reduction will then be no longer linear. Thus, it all depends on the fact that the end of the measuring lug 3 entering into pickup 4, is bevelled so that in comparison with a rectangular end, a reduction is obtained as the variation of the explored area in the optical path of the light beam will be smaller than in the case of a rectangular end.

Based on the explanations given hereinbefore, the end of the measuring lug 3 which is coordinated with the optical pickup, can also be configurated other than straight-lined, e.g., curved, especially circular as shown in FIG. 4. The measuring lug 6 represented in FIG. 4 as a further modification, has a circular end with two sections 8 and 7. Whereas section 8 provides a measuring range of high reduction and low sensitivity, section 7 provides a measuring range of high sensitivity and low reduction. However, a measuring lug can also be used for a sensitivity in inverse order as shown in FIG. 5.

The signals produced by pickup 4 can then be used in known ways to give an exact indication of the vibrating behaviour of the rotor under test which is being scanned by the mass 1 adapted as a sensor.

It will be clearly seen that pickups other than optical may be used which are capable of scanning the variations of the area of the measuring lug according to the invention. For example, magnetically-operating pickups can be employed which measure the changes of a magnetic field caused by the vibrating measuring lug.

Preferably, a measuring lug with a straight-lined bevelled edge is used to obtain a linear reduction. In special cases, however, measuring lugs with edges of any configuration may be used to achieve non-linear reductions.

The invention offers the basic advantage that the vibration excursions are not directly measured, but indirectly and reduced. In particular, however, there is the advantage of an excursion of the frequency range for the measurement towards the low frequencies by using the spring of two different rigidities according to the invention.

What is claimed is:

1. A pickup for measuring vibrations comprising:
   a housing
   mass means for sensing the vibrations and moving as a function of those vibrations and having a portion adapted for contacting a object whose vibrations are to be detected,
   spring means mounting said mass means on said housing for urging said portion against said object and permitting movement of said mass means, as a function of said vibrations in a measuring direction
   a measuring member attached to said mass means for movement with said mass means in said measuring direction and having a straight line edge extending in said measuring direction at an angle less than 45° and inclined with respect to said measuring direction to provide a mechanical reduction of the excursions of said mass means as said mass means moves as a function of said vibration and
   means for detecting the excursions of said edge from a path extending transverse to said measuring direction and producing a signal which varies as a function of the excursions of said edge including a source of light, means for detecting light from said source, and means for mounting said source and light detecting means with said edge extending into the path between said source and detecting means.

2. A pickup as in claim 1 wherein the rigidity of said spring is greater at the start and in the first stage of the spring excursion than in the second stage and towards the end of said spring excursion.

* * * * *